United States Patent [19]
Hirota

[11] 4,066,936
[45] Jan. 3, 1978

[54] HYBRID BATTERY ELECTRIC DRIVE

[76] Inventor: Toshio Hirota, No. 3-5-20, Nakahara, Isogo, Yokohama, Japan

[21] Appl. No.: 582,359

[22] Filed: May 30, 1975

[30] Foreign Application Priority Data

June 10, 1974 Japan .................. 49-65029

[51] Int. Cl.² ........................................... H02P 5/00
[52] U.S. Cl. ...................... 318/139; 320/3; 320/61
[58] Field of Search ............... 318/139; 320/3, 4, 61

[56] References Cited

U.S. PATENT DOCUMENTS

| | | | |
|---|---|---|---|
| 3,683,258 | 8/1972 | Harbonn | 320/61 |
| 3,686,549 | 8/1972 | Winebrener | 318/139 |
| 3,809,978 | 5/1974 | Zubris | 318/139 |
| 3,823,358 | 7/1974 | Rey | 320/3 |

Primary Examiner—Gene Z. Rubinson
Attorney, Agent, or Firm—Robert E. Burns; Emmanuel J. Lobato; Bruce L. Adams

[57] ABSTRACT

The disclosure relates to a hybrid electric drive including a battery (E-battery) having high specific energy and a battery (P-battery) having a high specific power. These two batteries are electrically circuited with two armature coils connected to a motor shaft of a motor. The two armatures are electrically insulated from each other so that the batteries having different characteristics are electrically insulated from each other.

2 Claims, 1 Drawing Figure

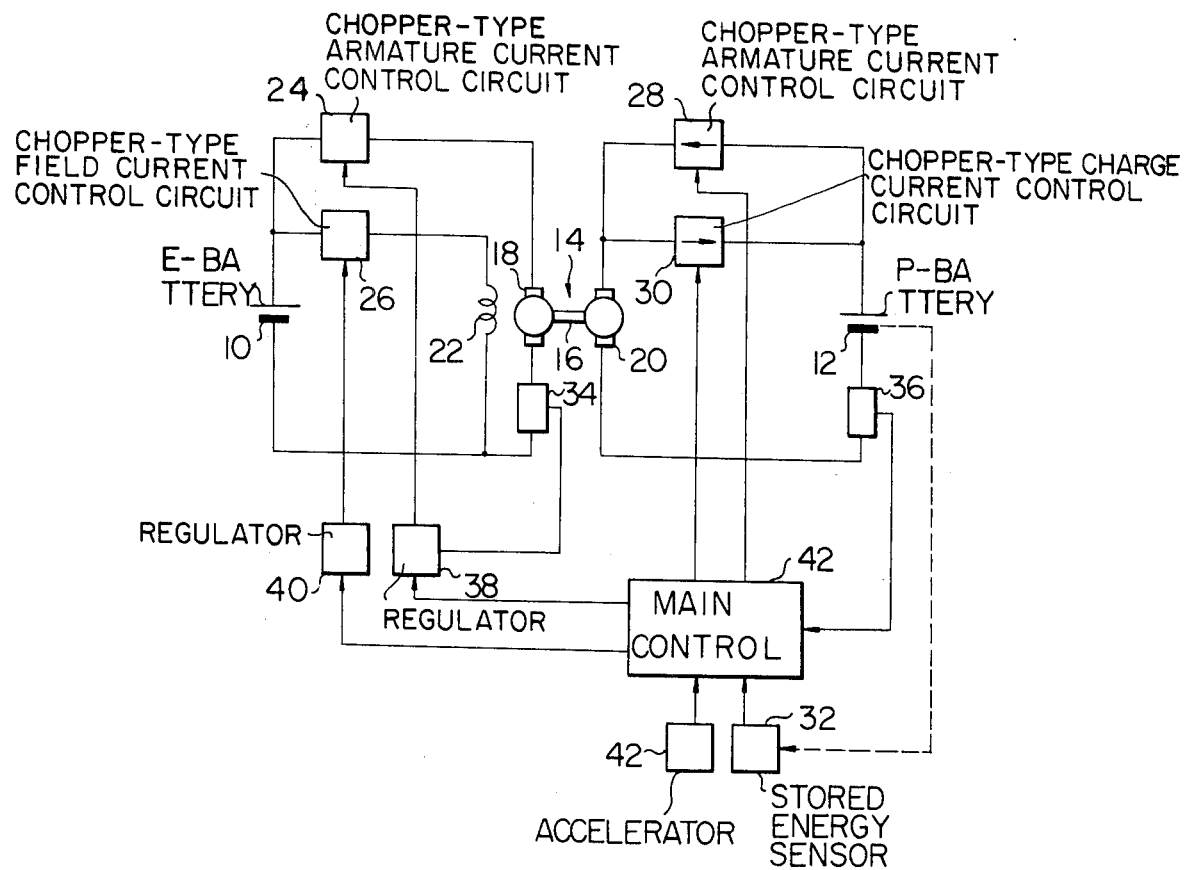

HYBRID BATTERY ELECTRIC DRIVE

BACKGROUND OF THE INVENTION

The present invention relates to a hybrid battery electric drive using two different batteries having high energy density and high power density, respectively.

Specific power and specific energy of batteries are usually related in an inverse manner. A battery with high specific power normally has a low specific energy, and a battery with high specific energy a low specific power. A fuel cell battery, a zinc-air battery and a radioisotope generator are regarded as a battery with high specific energy, whereas a lead-acid battery, an alkaline battery and a condensor as a battery with high specific power. For brevity, a battery with high specific power to give higher power will be hereinafter referred to as a P-battery while a battery with high specific energy to give better range will be referred to as a E-battery.

Many hybrid battery systems have been developed to meet variable load in powering a propulsion motor or motors of an electric vehicle or submarine. One typical hybrid battery system of them uses a P-battery electrically paralled with a E-battery and is electrically arranged with a dc electric motor such that the E-battery produces the power to operate the dc electric motor and recharges the P-battery during light load operation, and both batteries feed power to the motor during heavy load operation. One problem of the hybrid battery system is that for enabling electric current to be fed from the E-battery to the P-battery when the recharge of the P-battery is demanded, the terminal voltage of the E-battery has to be higher than that of the P-battery either by increasing the terminal voltage of the E-battery or by lowering the terminal voltage of the P-battery. On present state of development of the batteries a fuel cell battery or zinc-air battery is feasible for the E-battery. Such a battery is constructed of a plurality of individual cells each developing a low voltage and being provided with an electrolyte recirculator for the elimination of water consumed by each cell and the cooling purpose. Thus if the terminal voltage of this battery is to be increased to make the hybrid battery system feasible, a number of cells have to be arranged one after another along with the corresponding number of electrolyte recirculators attached to the cells. The results are that the leak current through the recirculated electrolyte increases because of the increase in quantity of the electrolyte and that the construction becomes complicated. If, on the contrary, the terminal voltage of the P-battery is lowered, the quantity of electric current must be increased to obtain the same power output. Usually in an electric vehicle, the power to be produced by the P-battery occupies a greater proportion of all the power to operate a dc electric motor during the full load operation. The ratio of the power given by the E-battery to that by the P-battery in the hybrid battery system under full load operation of the electric vehicle is approximately 1:3. It will therefore be understood that the cost of circuit configuration increases because control elements having a large capacity to control large current from the P-battery are necessary and that the efficiency reduces because of the considerable power loss with the use of large current with low voltage.

SUMMARY OF THE INVENTION

It is an object of the present invention to provide a hybrid battery electric drive in which the above mentioned problem encountered in the prior art is eliminated.

In accordance with the present invention there is provided a hybrid battery electric drive comprising: a motor having a first and a second armature coil which are interconnected through a shaft for simultaneous rotation and which are insulated with each other, the motor having a field coil common to the first and second armature coils; a first battery having a high specific energy (E-battery), the first battery being electrically circuited with the first armature coil and with the field coil; and a second battery having a high specific power (P-battery), the second battery being electrically circuited with the second armature coil.

The result achieved by the present invention is that since the E-battery and the P-battery are electrically insulated with each other, it is not necessary to have voltage across the E-battery higher than that across the P-battery.

The other objects, features of the present invention will become clear from the following description in connection with the accompanying drawing, in which:

BRIEF DESCRIPTION OF THE DRAWING

Single FIGURE diagrammatically illustrates a preferred embodiment of the present invention.

DESCRIPTION OF THE PREFERRED EMBODIMENT

Referring to the accompanying drawing, there is shown a portion of a hybrid battery electric drive of the invention, in which designated by the reference numerals 10 and 12 are a E-battery (a battery with high specific energy) and a P-battery (a battery with high specific power), respectively. A dc electric motor generally designated by the reference numeral 14 has a shaft 16 drivingly connected to traction wheels of an electric vehicle (not shown). The motor 14 has a first armature coil 18, a second armature coil 20 and a field coil 22 common to these armature coils. The armature coils 18 and 20 are connected to the shaft 16 for rotation therewith, and they are mechanically interconnected through the shaft 16 but they are electrically disconnected or insulated from each other.

To feed power to the motor 14 from the E-battery, armature current control including a chopper-type circuitry 24 connects the E-battery 10 to the armature 18 and field current control including a chopper-type circuitry 26 connects the E-battery 10 to the field coil 22. The chopper-type circuitry 24 and the chopper-type circuitry 26 control armature current through the armature 18 and field current through the field 22, respectively. To feed power to the motor 14 from or discharge the P-battery 12, discharge current control including a chopper-type circuitry 28 connects the P-battery to the armature 20 of the motor 14, whereas to charge the P-battery 12, there is provided charge current control including a chopper-type circuitry 30. The chopper-type circuitry 28 and chopper-type circuitry 30 control armature current through the armature coil 20 when it is desired to power the motor 14 and armature current through the armature coil 20 when it is desired to charge the P-battery 12, respectively.

A "stored energy" sensor 32 is provided to monitor the charge state of the P-battery 12. An armature current detector 34 to monitor current through the armature coil 10 and an armature current detector 36 to monitor current through the armature coil 20 are provided. Also provided are a regulator 38 for the chopper-type circuitry 24 and a regulator 40 for the chopper-type circuitry 26. The reference numeral 42 designates a main control which controls the chopper-type circuitry 28, the chopper-type circuitry 30, the regulator 38 and the regulator 40 in response to load by an accelerator or manual controller 42 and in response to stored energy state within the P-battery 12 monitored by the "stored energy" sensor 32.

The circuit configuration described with reference to and illustrated in the accompanying drawing operates as follows.

When load demanded by the accelerator 42 is lighter than a predetermined load (light load) and stored energy state within the P-battery monitored by the "stored energy" sensor 32 is higher than a predetermined state (almost fully charged state), the chopper-type circuits 28 and 30 are disabled by the main control 42 to disconnect electrically the P-battery from the armature coil 20 so that neither charging nor discharging of the P-battery occurs, whereas the chopper-type circuits 24 and 26 are conditioned so that the E-battery 10 feeds power to the motor 14. In this operational mode, the regulator 40 causes the chopper-type circuitry 26 to keep current through the field 22 to a predetermined value and the regulator 38 causes the chopper-type circuitry 24 to increase current through the armature coil 18 responsive to the increase of the load determined by the accelerator 42.

When load demanded by the accelerator 42 is lighter than the predetermined load (light load) and the stored energy state within the P-battery is lower than the predetermined state (charge required state), only the chopper-type circuitry 28 is disabled by the main control 42 so that the armature coil 20 and the chopper-type circuitry 30 establishes a charge circuit for the P-battery 12, whereas the regulator 38 causes the chopper-type circuitry 24 to keep current through the armature coil 18 to a predetermined value and the regulator 40 causes the chopper-type circuitry 26 to increase current flowing through the field coil 22 to a higher value than the predetermined value so as to operate the armature coil 20 as a generator. It is to be understood that power discharged from the E-battery 10 in this operational mode is constant and the power spilts into a portion consumed to drive traction wheels (not shown) through the shaft 16 and into the remaining portion fed to the P-battery 12 to charge the same. In fact, increasing the charging current will result in the reduction of the motor torque to drive the traction wheels and vice versa. Thus the chopper-type circuitry 10 is controlled to decrease charging current fed to the P-battery responsive to the increase of load determined by the accelerator 42.

When load demanded by the accelerator 42 is heavier than the predetermined load (heavy load), the chopper-type circuitry 30 is disabled whereas the regulator 38 causes the chopper-type circuitry 24 to keep current through the armature coil 18 to the predetermined value and the regulator 40 causes the chopper-type circuitry 26 to decrease current flowing through the field coil 22 to a lower value than the predetermined value. The chopper-type circuitry 28 is controlled to increase armature current through the armature coil 20 responsive to the increase of load determined by the accelerator 42.

Although in the preceding description and illustration of the preferred embodiment of the invention, a motor having two armature coils interconnected by a shaft and a common field coil, the two ordinary motors may be used by coupling their shafts one after another and by having their field coils paralled.

It will now be appreciated that voltages across the E-battery and P-battery can be set to their most efficient voltages since the E-battery and P-battery are electrically insulated. As a result, the efficiency of each of these batteries increases, the manufacturing cost of each of them reduces, and it becomes relatively easy to protect the E-battery due to its electrical insulation from the P-battery.

What is claimed is:

1. In a hybrid battery electric drive: a motor having a first armature coil, a second armature coil mechanically connected to said first armature coil for simultaneous rotation and insulated from said first armature coil and a field coil common to said first and second armature coils;
    a first battery having a high specific energy, said first battery being electrically connectable in use with said first armature coil and said field coil;
    a second battery having a specific power, said second battery being electrically connectable in use with said second armature coil; and
    means for alternatively connecting in dependence upon the load on the motor said first battery to said first armature and to said first coil and second battery to said second armature coil.

2. A method for operating a hybrid battery electric drive comprising a motor having a first armature coil, a second armature coil mechanically connected to said first armature coil for simultaneous rotation and insulated from said first armature coil and a field coil common to said first armature coil and a field coil common to said first and second armature coils; a first battery having a high specific energy electrically connectable in circuit with said first armature coil and said field coil; and a second battery having a high specific power electrically connectable in circuit with said second armature coil, comprising:
    a step of feeding power to said motor from said first battery and electrically disconnecting said second battery from said second armature coil when a load on said motor is lighter than a predetermined load and when stored energy of said second battery is higher than a predetermined state;
    a step of feeding power to said motor from said first battery and electrically connecting said second battery with said second armature coil so that a portion of the power is fed to said second battery when the load on said motor is lighter than the predetermined load and when stored energy of said second battery is lower than said predetermined state; and
    a step of feeding power to said motor from said first and second batteries when said load is greater than said predetermined load.

* * * * *